Patented May 16, 1950

2,508,196

UNITED STATES PATENT OFFICE 2,508,196

SILOXANE POLYMERS

Martin P. Seidel, Pittsburgh, Jack Swiss, McKeesport, and Clyde E. Arntzen, Turtle Creek, Pa., assignors to Westinghouse Electric Corporation, East Pittsburgh, Pa., a corporation of Pennsylvania No Drawing. Application June 2, 1945, Serial No. 597,380

4 Claims. (Cl. 260—46.5)

This invention relates to the process of treating intermediate siloxane polymers and the products resulting therefrom.

It is known that by hydrolysis of various silicon esters, silanols may be prepared; the silanols undergo dehydration readily to form polymeric products known as siloxane, in which alternate silicon-oxygen atoms are the predominating feature. By appropriate treatment the polymeric products so produced have been converted into resinous solids having a moderate degree of thermal resistance. However, experience with these siloxane polymers shows that the solids when subjected to high temperatures are not stable. The siloxane polymers shrink and crack when subjected to elevated temperatures for prolonged periods of time. It is believed that the siloxane polymers, even though converted to a solid state, contain an appreciable number of hydroxyl groups which undergo slow condensation with elimination of water. This process apparently accounts for the thermal instability of the siloxane polymers at elevated temperatures. However, the condensation and elimination of water from the siloxane polymers occurs even at moderate temperatures such as are encountered in the operation of electrical apparatus, with resulting cracking and shrinking of the polymers.

We have discovered that by subjecting intermediate siloxane polymers to conditions favoring intramolecular dehydration, to remove a substantial proportion of residual hydroxyl groups, resinous solids may be produced therefrom having greatly increased thermal stability.

The object of this invention is to provide a treatment to increase the stability of solid siloxane polymers.

A further object of the invention is to remove intramolecularly hydroxyl groups present in intermediate siloxane polymers.

Another object of the invention is to provide solid siloxane polymers of increased stability.

Other objects of the invention will in part be obvious and will in part appear hereinafter.

In order to produce siloxane polymers, silanol compounds having organic radicals of any desired nature directly attached to silicon atoms, the organic radicals being present in any desired proportion up to three per silicon atom, are initially condensed by dehydration to produce a predetermined molecular association. For most purposes the product resulting from the initial dehydration is a liquid or syrupy product which is still soluble in organic solvents. The partially dehydrated silanols contain a substantial number of hydroxyl groups as is shown in the following example:

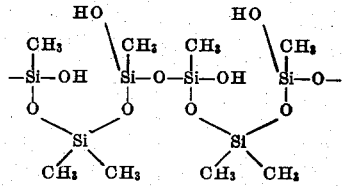

The above formula indicates a partially dehydrated siloxane polymer containing an average of 1.33 methyl groups and 0.67 hydroxyl group per silicon atom. According to our invention the intermediate siloxane polymers, such as in the example, are dissolved in sufficient solvent to produce a dilute solution having a concentration of less than 25% by weight of the polymer. The dilute solution is treated with a strong dehydrating agent capable of removing hydroxyl groups intramolecularly without adversely affecting the siloxanes otherwise. The number of molecular groups should be relatively unchanged by the latter dehydration. The resulting product produced by dehydration of the specific example above is believed to have a ring-type structure corresponding to the following:

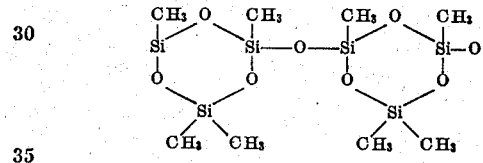

We have found that the intramolecular removal of hydroxyl groups is best accomplished by treating quite dilute solutions of silanols that have been first partially dehydrated to condense them in order to produce intermediate siloxane polymers of a desired molecular weight. It is desirable that the solution of partially dehydrated siloxane be so dilute that subsequent dehydration must take place almost entirely within the molecule whereby the number and size of the molecular aggregations is not appreciably affected. If concentrated solutions of the intermediate siloxane polymers were to be subjected to dehydration there would be a greater chance for hydroxyl groups between separate molecules to be condensed thereby building up the molecules and the product would be less suitable for subsequent application. For most purposes treating solutions containing a concentration of about 5% by weight of the intermediate siloxanes gives excellent results. More dilute solutions may be desirable in some cases. However, the amount of solvent required becomes a problem with solutions more dilute than 1%. We have secured good results by treating solutions having a concentration of 20% of the siloxane polymer being dehydrated intramolecularly.

When carried out as disclosed herein, the reaction taking place is an intramolecular condensation of hydroxyl groups with elimination of water rather than intermolecular condensation for the reason that there is no significant increase in viscosity of the siloxane solutions. Intermolecular condensation does cause an increase of viscosity. Furthermore the treated siloxanes show a greatly decreased shrinkage on polymerizing to a solid state and subjecting the solid to prolonged heat treatment as compared to solid siloxanes not having undergone previous intramolecular condensation treatment. Additionally the siloxanes dehydrated according to the invention show an increased solubility in non-polar solvents and decreased solubility in hydroxylated solvents. When tested with alternating electrical current the solid siloxane polymers of our invention show much lower electrical losses than the same base material solidified without the treatment disclosed. It should be understood that while this evidence strongly indicates an intramolecular dehydration, we do not wish to limit the invention to such interpretations, but rather employ the term "intramolecular condensation" to indicate the general results of treating a solution containing less than about 25% of a partially polymerized siloxane with a dehydrating agent whether or not this action occurs.

The dilute solution of the intermediate siloxane polymer may be treated with a number of dehydrating agents capable of removing hydroxyl groups intramolecularly. Excellent results have been obtained by employing either sulfuric acid of a concentration of from 65% to 90% or phosphoric acid of a concentration of from 70% to 85% or mixtures of both. We may employ phosphorus pentoxide in a suitable carrier. Other dehydrating agents may be employed.

In treating the dilute siloxane solution the dehydrating agent should be vigorously stirred or otherwise caused to come into intimate contact with the dissolved siloxane polymer. A contact period of the order of from fifteen minutes to one hour has been found to be sufficient to remove an optimum proportion of the residual hydroxyl groups. In some cases it may be desirable to separate the dehydrating agent from the siloxane solution and repeat the treatment of the solution with fresh dehydrating agent.

The dehydration to remove hydroxyl groups intramolecularly may be carried out on solutions of intermediate siloxane polymers such as are sold in the trade or the process may be made a part of the method for converting silicon esters into siloxane polymers. The following examples relate to both processes.

Example No. 1

Ten parts by weight of an intermediate methyl phenyl siloxane polymer was dissolved in 200 parts by weight of toluene thus forming a 5% solution. There was added to the solution 60 parts by weight of 75% sulfuric acid and the mixture at a temperature of 25° C. was stirred for one hour. 200 parts by weight of chipped ice was added to the mixture and on standing two layers separated; the sulfuric acid layer was withdrawn and the toluene layer was given several washings with water to remove the sulfuric acid. The siloxane-toluene solution was concentrated by evaporating toluene to approximately 20 parts by weight. The resulting solution was suitable for use as a varnish for treating members.

The original methyl phenyl siloxane polymer and the solution of siloxane polymer resulting from the treatment were poured into separate glass vials and polymerized by heating at 250° C. for about eight hours. The solid siloxane resin in each of the vials was placed in an oven operating at a temperature of 250° C. while exposed to air. The untreated methyl phenyl siloxane polymer had cracked and pulled away from the sides of the vials in which it had been polymerized after 162 hours in the oven. The intramolecularly dehydrated siloxane polymer withstood 952 hours in the oven before cracking and pulling away from the sides of the vials was observed. This indicates that the solid intramolecularly dehydrated siloxane polymer of our invention was approximately six times as stable as the untreated siloxane polymer. Other tests support this indication of a very definite increase in life by the treatment of siloxane polymers to remove hydroxyl groups intramolecularly.

The 5% siloxane solution of Example 1 was treated with 75%, 80%, 85% and 90% sulfuric acid at temperatures as high as 100° C., and over 95% of the original weight of silicone was recovered. Using sulfuric acid of a concentration of 95.5% to treat the 5% siloxane solution at room temperature the recovery of siloxane was about 50%—the remainder was converted into an insoluble gel.

With more dilute siloxane solutions, dehydrating agents of greater strength and in greater amounts may be used without undesirable results. On the other hand a 30% siloxane solution cannot be treated with a 75% sulfuric acid solution without causing gelation and thus rendering the resin useless for its intended purpose.

In some cases, siloxanes having a relatively great proportion of hydroxyl groups may be treated advantageously by applying progressively stronger solutions of dehydrating agent. For example 60% sulfuric acid may be applied first, then 70% sulfuric acid and finally 80% sulfuric acid.

Example No. 2

50 parts by weight of an intermediate methyl phenyl siloxane polymer was dissolved in 280 parts by weight of a hydrocarbon solvent to produce a solution having a concentration of 15%. The solution was treated with 155 parts by weight of 75% sulfuric acid with vigorous stirring for one hour, the sulfuric acid was then diluted with ice, and after standing, the acid layer was decanted. The polymer in the hydrocarbon solvent layer was washed with an aqueous solution of barium hydroxide to remove all traces of the acid. The siloxane was then polymerized to a solid and when subjected to the glass vial test withstood 569 hours at 250° C. without cracking or withdrawing from the sides of the glass vial.

Example No. 3

A mixture of 0.4 mole of dimethylsilicon diethoxide and 0.6 mole of methylsilicon triethoxide was dissolved in 457 cc. of toluene and the solution was refluxed while 100 cc. of 5% sulfuric acid was added over a period of 45 minutes. The mixture was further stirred for 15 minutes after the sulfuric acid had been added. The treatment caused the hydrolysis of the silicon esters with simultaneous dehydration to build up silicon-oxygen chains, thereby producing an intermediate siloxane polymer. Water was then added to the mixture and the layers separated. The toluene layer containing the siloxane was washed first with water, then aqueous potassium carbonate, and then water again and finally dried over anhydrous potassium carbonate. The solution was then further refluxed in a column having a moisture trap for five hours for removal of the water by the trap.

The water-free siloxane solution was then stirred with 222 cc. of 75% sulfuric acid at a temperature of about 10° C. for twenty minutes in order to remove hydroxyl groups intermolecularly. Chipped ice was then added and, upon standing, the separated water and acid layer was removed. The toluene layer was washed with water followed by aqueous potassium carbonate and water again. The water-free toluene layer contained the treated siloxane polymer. The siloxane resin with an oxidizing inhibitor and 10% dioctyl phthalate after being solidified in a glass vial withstood 314 hours in an oven at 250° C. exposed to air before separating from the glass. The same resin without the dehydration treatment to remove hydroxyl groups intermolecularly had a life of less than one hour at 250° C. by the glass vial test.

*Example No. 4*

A mixture of 0.8 mole of dimethylsilicon diethoxide, 1 mole of methylsilicon triethoxide and 0.2 mole of phenylsilicon triethoxide in 995 cc. of toluene was hydrolyzed with 200 cc. of 5% sulfuric acid in water first to hydrolyze the silicon esters and then to cause dehydration and condensation of the silanols thus produced. The dilute sulfuric acid solution was removed and the toluene solution of the intermediate siloxane polymer was washed with water, aqueous potassium carbonate and water, and the washed toluene solution was dried over anhydrous potassium carbonate. Residual amounts of water were removed by refluxing for five hours in a column equipped with a moisture trap. Four hundred cubic centimeters of the toluene solution was then stirred in 100 cc. of 75% sulfuric acid for 45 minutes and then chipped ice and water were added. The toluene layer was separated from the acid layer and treated with aqueous barium hydroxide solution. The toluene layer was clarified by centrifuging and finally toluene was replaced by a higher boiling point petroleum solvent by distillation.

A solid siloxane polymer resulting therefrom had a life of 191 hours at 250° C. by the glass vial test. The same siloxane polymer without the treatment with 75% sulfuric acid after solidification had a life of less than one hour by the glass vial test.

In the above examples, it will be noted that the amounts of the sulfuric acid or phosphoric acid dehydrating agent is in excess of the weight of the partially condensed organosiloxane being condensed intramolecularly. Furthermore, after the treatment, the acid is substantially completely removed.

Many organic siloxanes may be treated according to the invention. The silicon esters that may be subjected to hydrolysis, initial dehydration to build up polymers and the dehydration intramolecularly, may be either organosilicon chlorides or organosilicon ethoxides or the like. The intermediate siloxanes are composed of polymers having Si-O-Si linkages and have at least several groups with the following structure:

where R is an aliphatic or aryl group, such for example as ethyl, methyl, allyl, phenyl, and tolyl.

The intramolecularly dehydrated siloxanes may be further polymerized to resinous solids alone by appropriate heat treatment, with or without catalysts. They may be applied in solution or as dispersions to sheet materials such as glass fiber or asbestos cloth and polymerized to a resinous state to produce treated laminates or sheets. Conductors, electrical coils, and numerous other members may be impregnated with the treated siloxanes.

From the above examples it will be apparent that residual hydroxyl groups in intermediate siloxane polymers may be treated in a relatively dilute solution thereof with a dehydrating agent capable of removing a substantial proportion of the hydroxyl groups in the polymer intramolecularly. The resulting siloxane polymer, with or without plasticizers, anti-oxidizing agents, catalysts and fillers, may be treated by heating to produce solid resinous products having a greatly increased life since the thermal stability of the products is greatly increased. Since the siloxane polymers are inherently intended for high temperature applications the increase in thermal stability attained by the practice of this invention is highly valuable.

Since certain changes in carrying out the above process and product and certain modifications may be made without departing from its scope, it is intended that all the matter contained in the above description shall be interpreted as illustrative and not in a limiting sense.

We claim as our invention:

1. The method of preparing an organosiloxane comprising the steps of hydrolyzing and partially condensing an organosilane having only monovalent hydrocarbon and readily hydrolyzable groups attached to silicon, the hydrocarbon groups averaging less than the hydrolyzable groups, the hydrolysis and condensation being effected in a mixture of the organosilane, a hydrocarbon solvent, water and a strong mineral acid in an amount to produce a dilute aqueous solution with the water, separating from the mixture the hydrocarbon solvent containing the partially condensed organosiloxane, thereafter preparing a solution of the partially condensed organosiloxane and an organic solvent having a concentration of organosiloxane of less than 25% by weight, admixing into the solution of organosiloxane at least one aqueous dehydrating mineral acid selected from the group consisting of sulfuric acid and phosphoric acid, the sulfuric acid being of a concentration of from 60% to 90% and the phosphoric acid being of a concentration of from 70% to 85% by weight, the aqueous mineral acid being in excess of the weight of the organosiloxane and being maintained in intimate contact with the organosiloxane solution for a period of time of at least fifteen minutes, and at the end of this period removing the aqueous mineral acid substantially completely from the organosiloxane solution, whereby the hydroxyl groups in the organosiloxane molecules are removed substantially intramolecularly and without substantial change in viscosity of the solution having the same concentration of organosiloxane.

2. The method of preparing an organosiloxane comprising the steps of hydrolyzing and partially condensing an organosilane having only monovalent hydrocarbon and readily hydrolyzable groups attached to silicon, the hydrocarbon groups averaging less than the hydrolyzable groups, the hydrolysis and condensation being effected in a mixture of the organosilane, a hydrocarbon solvent, water and a strong mineral acid in an amount to produce a dilute aqueous solution with the water, separating from the mixture the hydrocarbon solvent containing the partially condensed organosiloxane, thereafter preparing a solution of the partially condensed organosiloxane and an organic solvent having a concentration of organosiloxane of from 5% to 20% by weight, admixing into the solution of organosiloxane at least one aqueous dehydrating mineral acid selected from the group consisting of sulfuric acid and phosphoric acid, the sulfuric acid being of a concentration of from 60% to 90% and the phosphoric acid being of a concentration of from 70% to 85% by weight, the aqueous mineral acid being in excess of the weight of the organosiloxane and being maintained in intimate contact with the organosiloxane solution for a period of time of at least fifteen minutes, and at the end of this period removing the aqueous mineral acid substantially completely from the organosiloxane solution, whereby the hydroxyl groups in the organosiloxane molecules are removed substantially intramolecularly and without substantial change in viscosity of the solution having the same concentration of organosiloxane.

3. The method of preparing an organosiloxane comprising the steps of hydrolyzing and partially condensing an organosilane having only monovalent hydrocarbon and readily hydrolyzable groups attached to silicon, the hydrocarbon groups averaging less than the hydrolyzable groups, the hydrolysis and condensation being effected in a mixture of the organosilane, a hydrocarbon solvent, water and a strong mineral acid in an amount to produce a dilute aqueous solution with the water, separating from the mixture the hydrocarbon solvent containing the partially condensed organosiloxane, thereafter preparing a solution of the partially condensed organosiloxane and an organic solvent having a concentration of organosiloxane of less than 25% by weight, admixing into the solution or organosiloxane at least one aqueous dehydrating mineral acid selected from the group consisting of sulfuric acid and phosphoric acid, the sulfuric acid being of a concentration of from 60% to 90% and the phosphoric acid being of a concentration of from 70% to 85% by weight, the aqueous mineral acid having a concentration in the lower end of the said range of concentration, the aqueous mineral acid being applied in an amount in excess of the weight of the organosiloxane and maintained in intimate contact with the organosiloxane solution for a period of time of at least fifteen minutes, at the end of this period removing the aqueous mineral acid from the organosiloxane solution, repeating the step of admixing the mineral acid at least once, the succeeding portions of acid being of a higher concentration than the previous portions, maintaining each succeeding portion of acid in contact with the organosiloxane for a period of time of at least fifteen minutes, and withdrawing the mineral acid after each contact period, the final portion of acid being substantially completely removed, whereby the hydroxyl groups in the organosiloxane molecules are removed substantially intramolecularly and without substantial change in viscosity of the solution having the same concentration of organosiloxane.

4. The process of producing a solid resinous organosiloxane which comprises hydrolyzing and partially condensing an organosilane having only monovalent hydrocarbon and readily hydrolyzable groups attached to silicon, the hydrocarbon groups averaging less than the hydrolyzable groups, the hydrolysis and condensation being effected in a mixture of the organosilane, a hydrocarbon solvent, water and a strong mineral acid in an amount to produce a dilute aqueous solution with the water, separating from the mixture the hydrocarbon solvent containing the partially condensed organosiloxane, thereafter preparing a solution of the partially condensed organosiloxane and an organic solvent containing not in excess of 25% by weight of the organosiloxane, admixing into the latter solution in an amount in excess of the weight of the organosiloxane a mineral dehydrating agent selected from the group consisting of phosphoric acid and sulfuric acid, the sulfuric acid being of a concentration of from 60% to 90% and the phosphoric acid of a concentration of from 60% to 85%, maintaining the acid dehydrating agent in contact with the organosiloxane for a period of at least fifteen minutes, separating the mineral acid substantially completely from the treated organosiloxane, the solutions of the treated organosiloxane not increasing significantly in viscosity when compared with the original untreated organosiloxane, removing the organic solvent and polymerizing the organosiloxane to a solid resin, the solid resin so produced having better resistance to shrinkage when heated than the polymer derived by polymerizing the untreated resin.

MARTIN P. SEIDEL.
JACK SWISS.
CLYDE E. ARNTZEN.

REFERENCES CITED

The following references are of record in the file of this patent:

UNITED STATES PATENTS

| Number | Name | Date |
|---|---|---|
| 2,371,068 | Rochow | Mar. 6, 1945 |
| 2,375,998 | McGregor et al. | May 15, 1945 |
| 2,384,384 | McGregor et al. | Sept. 4, 1945 |
| 2,386,466 | Hyde | Oct. 9, 1945 |
| 2,389,477 | Wright et al. | Nov. 20, 1945 |
| 2,432,891 | Hervey | Dec. 16, 1947 |
| 2,435,147 | McGregor et al. | Jan. 27, 1948 |
| 2,437,204 | McGregor et al. | Mar. 30, 1948 |

OTHER REFERENCES

Robison et al., J. Chem. Soc. (London), vol. 101, 1912 pp. 2151 and 2152.

Kipping et al., J. Chem. Soc. (London) vol. 105, 1914 pp 484, 496 and 498.

Kipping J. Chem. Soc. (London) vol. 101, 1912 pg. 2106.

Stock: Hydrides of Boron and Silicon Cornell U. 1933 page 20.